United States Patent [19]

Kamp et al.

[11] Patent Number: 4,992,642

[45] Date of Patent: Feb. 12, 1991

[54] PLASMA TORCH WITH COOLING AND BEAM-CONVERGING CHANNELS

[75] Inventors: Ronald P. T. Kamp; Johannes P. De Meij, both of Eindhoven, Netherlands

[73] Assignee: U.S. Philips Corporation, New York, N.Y.

[21] Appl. No.: 326,579

[22] Filed: Mar. 21, 1989

[30] Foreign Application Priority Data

Mar. 28, 1988 [NL] Netherlands ........................ 8800767

[51] Int. Cl.[5] ........................ B23K 9/00

[52] U.S. Cl. ........................ 219/121.52; 219/121.5; 219/121.51; 219/121.49; 315/111.21

[58] Field of Search ........................ 219/121.36, 121.48, 219/121.49, 121.5, 121.52, 121.54, 74, 75, 121.51; 313/231.31, 231.41, 231.51; 315/111.21, 111.51

[56] References Cited

U.S. PATENT DOCUMENTS

| | | | |
|---|---|---|---|
| 3,895,209 | 7/1975 | Fairbairn | 219/121.5 |
| 4,125,754 | 11/1978 | Wassermann et al. | 219/121.36 |
| 4,147,916 | 4/1979 | Fairbairn | 219/121.52 |
| 4,766,287 | 8/1988 | Morrisroe et al. | 219/121.52 |
| 4,780,591 | 10/1988 | Bernecki et al. | 219/121.52 |

FOREIGN PATENT DOCUMENTS 1218661 1/1971 United Kingdom .

*Primary Examiner*—M. H. Paschall
*Attorney, Agent, or Firm*—Robert J. Kraus

[57] ABSTRACT

An improved plasma torch for the high-frequency capacitive generation of a plasma beam, a special nozzle construction providing a large-length, small-diameter plasma beam. The nozzle includes a first channel for cooling an internal plasma-generating electrode and a second channel for converging the plasma beam.

7 Claims, 1 Drawing Sheet

PLASMA TORCH WITH COOLING AND BEAM-CONVERGING CHANNELS

BACKGROUND OF THE INVENTION

The invention relates to a plasma torch for the high-frequency capacitive generation of a plasma beam, comprising a housing which includes a holder and an electrically non-conducting nozzle, the housing having an inlet aperture and the nozzle having an outlet aperture, and also a rod-shaped electrode which is arranged coaxially with respect to the housing.

Plasma torches for generating plasma beams are used in various industrial fields such as the local heating !0 of materials, welding and cutting, working and shaping glass including quartz glass, and flame spraying of materials. In a plasma torch plasma beams can be generated inductively or capacitively or by means of direct current.

German Offenlegungsschrift 1 765 104, corresponding to British Patent No. 1,218,661, discloses a device for capacitively generating a plasma beam. To that end, an exterior oscillator circuit of a high-frequency generator is connected to a tungsten electrode. A gas is passed along the electrode. In response to electric resonance a high electric voltage is produced at the electrode, causing the passing gas to be ionized. The electrode is enveloped by an electrically non-conducting tube. One side of the tube is provided with a nozzle, not further described, from which the plasma beam can escape. The plasma beam is brought into contact with a workpiece to be worked, the circuit being capacitively closed via the work piece. The said Offenlegungsschrift specifies a nozzle-workpiece distance of 5-15 mm.

SUMMARY OF THE INVENTION

The invention has for its object to provide an improved plasma torch, such that the plasma beam to be generated therewith can bridge a larger nozzle-to-workpiece distance than 15 mm, the resultant spot of the plasma beam on the workpiece being adequately effective for working this workpiece.

According to the invention, this object is accomplished by a plasma torch of the type defined in the opening paragraph, which is characterized in that an electrically non-conducting coaxially arranged can is disposed between the nozzle and the electrode, an interior side of the nozzle and an exterior side of the can enclosing an annular channel which tapers towards the outlet aperture, and an interior side of the can and a face of the electrode enclosing a cylindrical channel, the latter being connected to the inlet aperture. The cylindrical channel around the electrode enables cooling of the electrode by gas flowing through it. The tapering annular channel renders it possible for gas flowing through it to converge the plasma beam to be generated, so that the plasma beam can bridge a large gap between the nozzle and the workpiece. The gas flow rates are, for example, preferably chosen such that the gas flows are laminar. Whether the gas flow is laminar or not can be seen from the shape of the plasma beam. Different gasses can be used, for example argon, helium, nitrogen or a mixture of nitrogen and hydrogen. The electrode is made of a high-melting electrically conducting material such as tungsten, molybdenum or silicon carbide. Both the nozzle and the can are made of an electrically insulating ceramic material. The high-frequency generator which is to be connected to the electrode supplies an alternating current having a frequency of 13.56 to 27.12 MHz. With customary dimensions of the plasma torch the generator has a power from some hundreds of watts to some kW.

The plasma beam contains dissociated and ionized gas molecules, and also electrons. The dissociation and ionization energy stored in the gas is released on recombination at the surface of a workpiece positioned in the plasma beam. Because of the value of the available energy and the relatively small diameter of the beam a very high temperature can locally be produced. The workpiece may both be conductive and non-conductive. Since the plasma beam is a good conductor a strong high-frequency field will be generated in the spot in which the beam is incident on the workpiece (spot) which results in an additional energy generation in the form of dielectric or conduction energy in the workpiece. The magnitude thereof depends on the electrical properties of the material at the instantaneous temperature.

If an appropriate powder is added to the supplied gas, the plasma torch can also be used for the plasma spraying of materials, both metal or ceramic, on a workpiece.

It should be noted that the U.S. Pat. No. 3,894,209 also discloses a plasma torch. The torch described therein includes a hollow electrode through which gas can flow. Gas can also flow along the exterior side of the electrode. The torch has however no tapering nozzle so that a plasma beam of large length and small diameter is produced.

An embodiment of the plasma torch according to the invention, is characterized, in that the can is axially adjustable with respect to the nozzle. The gas flow in the tapering annular channel can be influenced thereby and consequently the convergence of the plasma beam produced. A screw thread connection between the can and a portion of the tube is very suitable for that purpose.

A further embodiment of the plasma torch according to the invention, is characterized, in that the electrode can be adjusted axially relative to the flow-out aperture of the nozzle. This adjustability also enables influencing of the shape of the plasma beam.

A special embodiment of the plasma torch according to the invention, is characterized in that the torch has a second inlet aperture which is connected to the tapering annular channel. Using this provision, the two gas flows, i.e. the gas flow flowing along the electrode and that flowing through the tapering annular channel can be adjusted independently from each other. This renders it possible to influence the shape of the plasma beam. The two gasses may be of the same type or may be different.

A suitable embodiment of the plasma torch according to the invention, is characterized in that the nozzle and/or the can are made of boron nitride. This ceramic material can comparatively easily be worked mechanically and can withstand very high temperatures, namely up to approximately 2775° C.

A preferred embodiment of the plasma torch according to the invention, is characterized in that the electrode is provided with a conical tip pointing in the direction of the flow-out aperture of the nozzle. The presence of such a tip provides a higher field concentration, as a result of which the start of the ionization of the gas flowing along the electrode occurs more easily. Depending on the phase of the electric field either electrons or positive ions will bombard the tip of the electrode and will heat it in a short period of time to a high temperature, which results in an increased electron emission and consequently increased dissociation and ionization of the gas.

The invention also relates to a nozzle and a can suitable for use in a plasma torch according to the invention.

BRIEF DESCRIPTION OF THE DRAWING

The invention will now be described in further detail with reference accompanying drawing, in which.

DESCRIPTION OF THE PREFERRED EMBODIMENT

Figure 1:
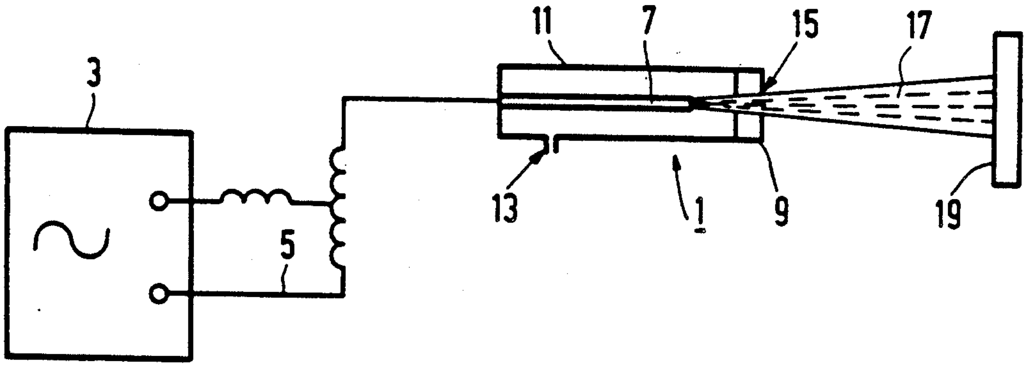
FIG. 1 is a basic circuit diagram of a plasma torch according invention.

In FIG. 1 reference numeral 3 denotes a high-frequency generator having an external resonant circuit 5. A customary frequency is 13.56 MHz or 27.12 MHz. The circuit 5 is electrically connected to an electrode 7 of a plasma torch 1. The plasma torch 1 has a nozzle 9 and an electrically insulating sleeve 11. Gas is introduced via an aperture 13. The gas can leave the plasma torch 1 via aperture 15 in the nozzle. If the resonant circuit 5 is tuned to the frequency of the generator 3, resonance produces a very high voltage in that spot of the coil where the electrode 7 is connected. The high electric field across the electrode 7 causes an initial ionization of the gas flowing along the pin. Depending on the phase, either electrons or positive ions will bombard the electrode and heat it considerably in a short period of time, which results in increased electron emission. The electrons contained in the gas flow can absorb energy from the high-frequency field and can transfer energy to the gas atoms and molecules by collision. This causes additional dissociation and ionization of the gas. The dissociation and ionization energy stored in the gas will become available on recombination, for example at the surface of a workpiece 19 positioned in the plasma beam 17 formed. The workpiece 19 may be a conductor or a non-conductor. Since the plasma beam is a good electrical conductor, an intense high-frequency field will be produced in the spot in which the beam is incident on the workpiece, which causes the generation of extra energy in the form of dielectric of conduction energy in the workpiece. Seen in a direction along the plasma beam, the energy generation is positionally dependent. The magnitude thereof depends on the electric properties of the material at the instantaneous temperature.

Figure 2:
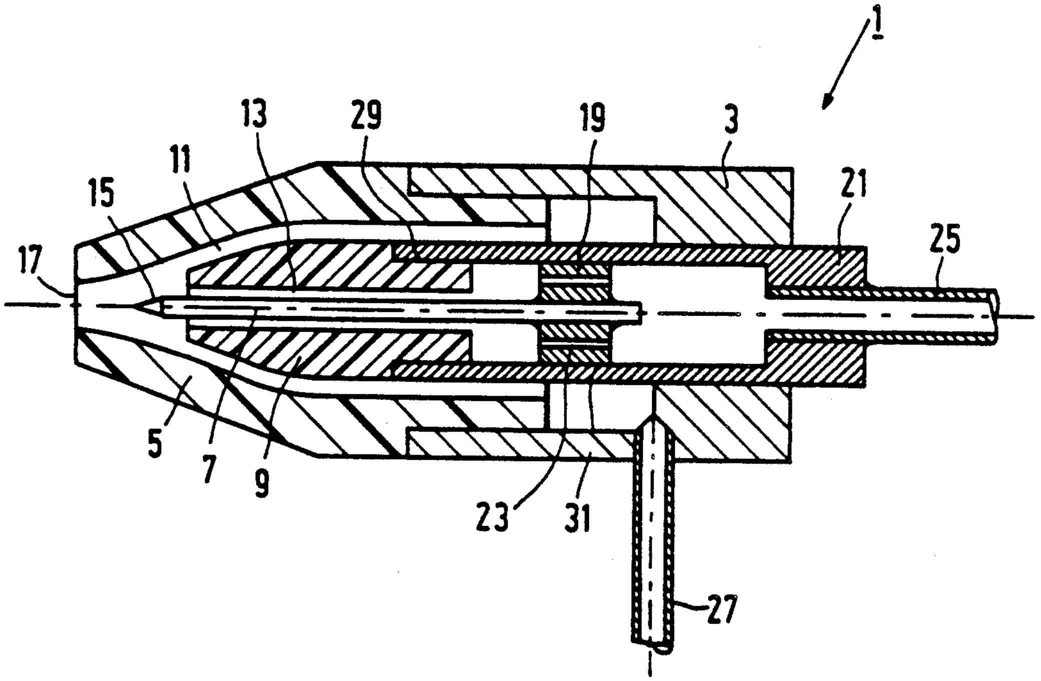
FIG. 2 is a longitudinal sectional view of a plasma torch according to the invention.

In FIG. 2 reference numeral 1 is a longitudinal section of a plasma torch according to the invention. The plasma torch has a cylindrical holder 3 and a nozzle 5. The holder 3 is made of brass. The nozzle 5 is made of boron nitride. The nozzle has an aperture 17 for the emerging plasma beam.

The torch has an electrically conducting tungsten electrode 7. The electrode has a conical point 15. Between the nozzle 5 and the electrode 7 there is a can 9, a tapering annular channel 11 and a cylindrical channel 13 being formed. The can 9, and also the nozzle 5, are made of boron nitride. The electrode 7 is fastened to the holder 3 by means of an electrode holder 19 and a sleeve 21. Both the electrode holder 19 and the sleeve 21 are made of brass. The electrode holder is provided with channels 23. These channels constitute the connection between a gas inlet pipe 25 and the cylindrical channel 13. The holder 3 is provided with a second gas inlet pipe 27, which is in connection with the tapering annular channel 11. The electrode 7 is connected to a high-frequency generator (27.12 MHz) via the elctrode holder 19, the sleeve 21 and the gas inlet pipe 25. Can 9 is adjustable in the axial direction with respect to the nozzle 5. Electrode 7 is also adjustable in the axial direction. To this end the contact plane 29 between the can 9 and the sleeve 21 is provided with thread (M20×1.5). The contact plane 31 between the electrode holder 31 and the sleeve 21 is also provided with thread (M12). This setting feature enables a laminar gas flow to exit the nozzle through aperture 17. The electrode diameter is 3 mm and the aperture of the nozzle is 5 mm. The gas flow rate amounts to 5–10 ltrs. per minute and the power of the generator is approximately 10 kW. The length of the generated plasma torch can be approximately 1 meter. The nozzle and the electrode both have an operating life of not less than 60 hours, for a plasma beam length of 35 mm.

We claim:

1. A plasma torch for high-frequency capacitive generation of a plasma beam, said torch comprising:
   a. a housing including fluid inlet means and an electrically insulating nozzle portion disposed about an axis and having a plasma outlet aperture;
   b. a rod-shaped electrode including a substantial length thereof disposed in the nozzle portion on the axis and having a tip portion adjacent the plasma outlet aperture;
   c. an electrically insulating tubular member having at least a substantial length thereof disposed in the nozzle portion around the electrode;

an inner surface of the tubular member and an outer surface of the electrode collectively defining a first annular channel in communication with the fluid inlet means and the outlet aperture, fluid carried in said first annular channel effecting cooling of said electrode; and an outer surface of the tubular member and an inner surface of the nozzle portion collectively defining a second annular channel which tapers toward the plasma outlet aperture and is in communication with the fluid inlet means, fluid carried in said second annular channel effecting convergence of the plasma beam.

2. A plasma torch as in claim 1 where the fluid inlet means comprises:
   a. a first fluid inlet aperture in communication with the first annular channel; and
   b. a second fluid inlet aperture in communication with the second annular channel.

3. A plasma torch as in claim 1 where the tubular member is axially adjustable with respect to the nozzle portion.

4. A plasma torch as in claim 1, 2 or 3 where the electrode is axially adjustable with respect to the plasma outlet aperture.

5. A plasma torch as in claim 1, 2 or 3 where the nozzle portion consists essentially of boron nitride.

6. A plasma torch as in claim 1, 2 or 5 where the tubular member consists essentially of boron nitride.

7. A plasma torch as in claim 1, 2 or 3 where the electrode includes a conical tip extending out of the tubular member in the direction of the plasma outlet aperture.

* * * * *